April 16, 1957 R. B. CUMMINGS 2,789,236

TONE GENERATOR FOR CABLE TESTING

Filed March 2, 1954 2 Sheets-Sheet 1

INVENTOR

Rodney B. Cummings.

BY Gustav Miller

ATTORNEY

April 16, 1957 R. B. CUMMINGS 2,789,236

TONE GENERATOR FOR CABLE TESTING

Filed March 2, 1954

2 Sheets-Sheet 2

INVENTOR.
Rodney B. Cummings
BY
Gustave Miller
ATTORNEY 2,789,236
Patented Apr. 16, 1957

2,789,236

TONE GENERATOR FOR CABLE TESTING

Rodney B. Cummings, Philomath, Oreg.

Application March 2, 1954, Serial No. 413,608

2 Claims. (Cl. 307—132)

This invention relates to systems, equipment and methods for locating trouble such as accidental shorts or grounds existing on telephone or power circuits as typical examples and constitutes improvements over that disclosed in my Patents Number 2,142,304 dated January 3, 1939 and 2,291,533, dated July 28, 1942. According to these patents cable tones for similar purpose have employed a series arrangement of energy source, electromagnet, a set of vibrating contacts operated by the electromagnet and a by-passing condenser, whereby electrical impulses of predetermined frequency are maintained over the line.

The object of the invention is to provide positive means for location of faults in circuits including power, telephone and telegraph circuits.

A further object is the provision of light durable and efficient apparatus for locating line troubles.

A further object is the provision of apparatus that can apply one or more tone frequencies to a line circuit.

In the telephone industry any device that sends out electrical impulses or alternating current impulses that can be heard by means of an audio amplifier or a telephone receiver and is used for following the path of such current impulses through telephone wires is called a cable tone. Accordingly, the phrase "cable tone" is thus used throughout this specification.

In the broad aspect of the invention an intermittenly interrupted current is transmitted from the cable tone device through the lines to be tested. An exploring coil, such for example, as shown in my earlier patents when shifted along the wires and indirectively related thereto will pick up current when in the path of the current emanating from the cable tone. The tone includes a thermo type interruption which produce notably better transmission characteristics.

In the drawings wherein similar numerals indicate similar parts:

Figure 1:
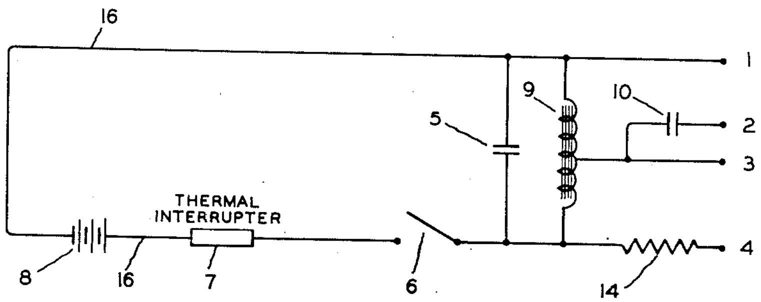
Fig. 1 shows a schematic arrangement of the cable tone.

In the practice of this invention the tone equipment includes a thermal type of interrupter as distinguished from interrupters of the spring type, vacuum tube, clock mechanism or vibrating need or combination of these interrupters.

The thermal interrupter is a very quiet device so that it is scarcely audible or impress mechanical vibrations. As a consequence the tone is a very pleasant one and smooth and the vibrations are uniform and clearly effected. As can be seen from the drawing the thermal interrupter may be used in many different combinations in the tone device to get many different values in the output based on voltage and frequency values.

The invention may be more completely understood by reference to the drawing sketch shows the circuit arrangements employed.

Referring now to Fig. 1 there is shown a circuit diagram of the cable tone device wherein a battery 8 may have its current interrupted by the thermal type of interrupter 7 in series with a single pole, single throw switch 6 to place a pulsating or vibrating current on an electromagnetic coil 9 which is shunted by a condenser 5 which can tune out undesired frequencies. Output terminals extend from the electromagnetic coil and are designated 1, 2, 3 and 4 respectively. In use two terminals may be used in operation of the device as for example terminal 4 with terminal 1, 2 or 3 by direct attachment to the lines or to line and ground in which troubles are to be located.

It will be noted that a condenser 10 is interposed in the terminal 2 to change the tone characteristic from that obtained from terminal 3. A resistance 14 is incorporated between the electromagnetic coil and terminal 4 to prevent an accidental dead short circuit. The constants represented by the resistance and the impedances of the condensers and coil, interrupter etc., may be selected for the particular battery voltage used.

Figure 2:
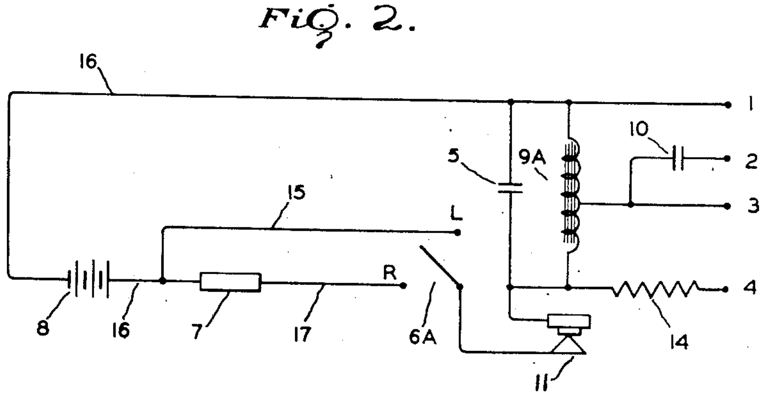
Figs. 2 through 4 show different modifications of the cable tone.

Fig. 2 shows a tone device including the battery 8, thermo interrupter 7 terminals 1 to 4, resistance 14 and condenser 5 all shown in Fig. 1. The electromagnetic coil 9 of Fig. 1 is replaced by one that includes a vibrating contact 11 so as to constitute the buzzer **9*a***. This buzzer is similar to that illustrated in my Patent No. 2,291,533.

In this Fig. 2 the single throw switch of Fig. 1 is replaced by a single pole double throw switch 6A. A lead has one end connected to the lead 16 between the battery 8 and thermal interrupter 7 and the other end of lead 16 is connected to point L of the double throw switch 6A. A lead 17 is connected between point R of the switch 6A and adjacent end of thermal interrupter 7.

It will be clear that the operation of the tone device in Fig. 1 is due to the interruptions of the thermal device. In Fig. 2 the operation of the device may be had from the buzzer alone when the switch 6A is at position L or from the thermal interrupter and buzzer in series through point R of the switch 6A. The effect of the thermal interrupter and buzzer in series is to produce an interrupted buzzer tone.

In lieu of the buzzer contact 11 a vibrating reed may be substituted.

Figure 3:
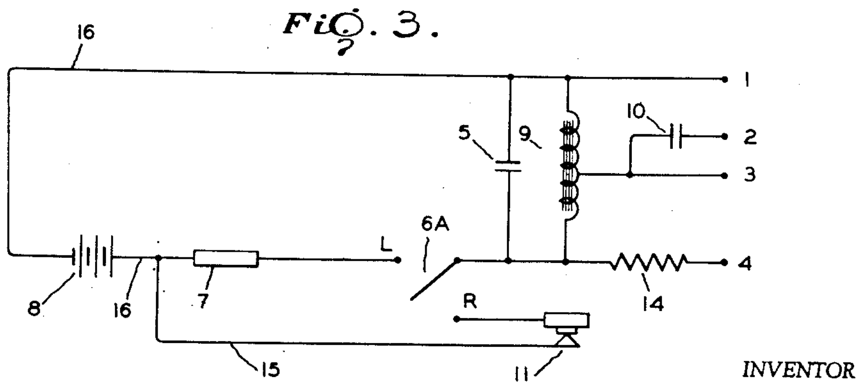

Fig. 3 is similar to Fig. 2 with the execptions that the wiring is arranged that the thermal interrupter may be used without the buzzer contact instead of the other way. The thermal interrupter and buzzer contact may still be connected in series for optional use.

Figure 4:
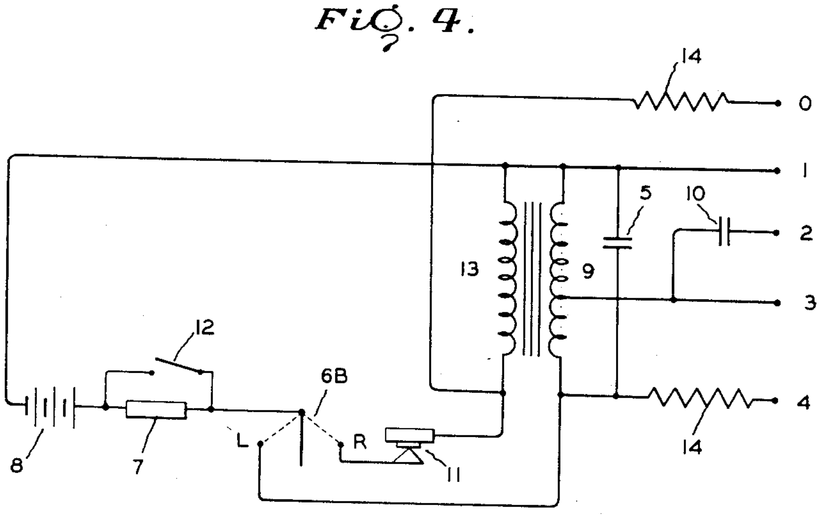

Fig. 4 illustrates a transformer type tone device whereby primary and secondary windings may be utilized. In this form of device a battery 8 is connected to the primary coil of the transformer by vibrating contact 11 of a buzzer or reed through a thermal interrupter 7 and switch 6B in the R position. A switch 12 may be placed across interrupter 7 so as to by pass such element and employ only the vibrating contact 11. It is evident that the output of the transformer may be obtained from selected pairs of leads depending on the voltage to be applied to the line in which troubles are to be located.

When the switch 6B is placed in the position L the interrupted current from interrupter 7 is placed on the secondary side of the transformer to obtain similar functions as in Fig. 1. According to the circuits in Fig. 4 any of a variety of voltages and frequencies may be had. Then, there is one more output terminal than in the other figures and there can be had a steady buzzer tone, an interrupted buzzer tone and a thermally interrupted tone.

Figure 5:
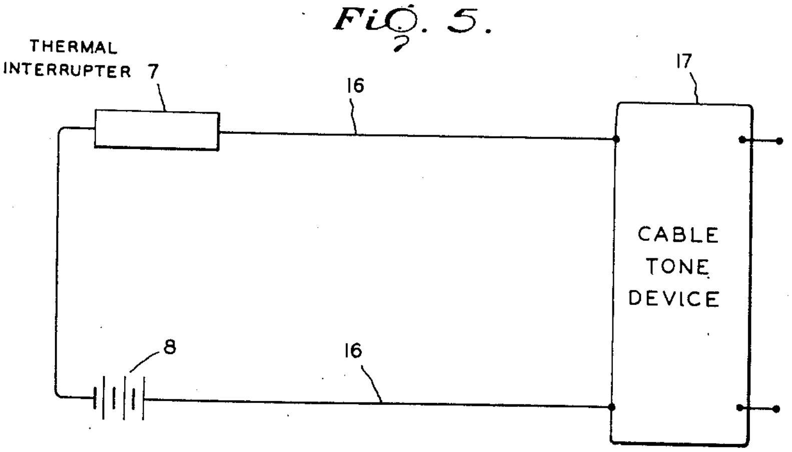
Fig. 5 shows a circuit adapted to be connected with any cable tone now in general use.

Fig. 5 illustrates a cable tone 17 which may be one already known such as that in my Patent No. 2,291,533, Figs. 1 and 7. In such cable tone the circuit could be added having the battery therein as well as the thermal interrupter 7.

Referring again to Fig. 4 terminals 0 and 4 when used produce the greatest tone output volume. Terminals 1 and 4 give less volume and have a condenser across the output which tunes out the higher frequencies, not desired. Terminals 1 and 0 when applied give a different tone value, useful for tracing lines when greater volumes cause interference on talking telephone lines. Terminals 2 and 4 are useful for low volume where telephone conversations should not be interrupted. Terminals 3 and 4 give still lower volume tones. Other combinations of terminals may be used such as 3 with 1 or 0.

The novel features and the operation of the tone devices will be apparent from the foregoing description, while the devices have been shown and described in detail, it is obvious that this invention is not to be considered limited to the exact form disclosed, and that changes may be made therein within the scope of what is claimed without departing from the spirit of the invention.

Having thus set forth and disclosed the nature of this invention what is claimed is:

1. In a system for locating faults in transmission lines and the like, a source of electric energy, a thermal interrupter, a switch adapted to shunt the interrupter, a two way switch the middle point of which is connected to the interrupter, a buzzer contact, a transformer primary coil terminal and an output lead terminal connected to a second point of the two way switch, the transformer secondary having one terminal and an output lead terminal connected to a third point of the two way switch, the opposite transformer ends and an output lead being connected together and to the source of electric energy; and voltage taps extending from at least an intermediate portion of the transformer secondary.

2. The system of claim 1 and a condenser in an output lead to change the current characteristic.

References Cited in the file of this patent

UNITED STATES PATENTS

| | | |
|---|---|---|
| 1,412,376 | Stoller | Apr. 11, 1922 |
| 1,518,335 | McNicol | Dec. 9, 1924 |
| 2,192,506 | Ruben | Mar. 5, 1940 |
| 2,291,533 | Cummings | July 28, 1942 |
| 2,641,633 | Hosford, Jr. | June 9, 1953 |